W. JACKSON.
Air-Compressing Apparatus for Locomotives.
No. 218,029. Patented July 29, 1879.
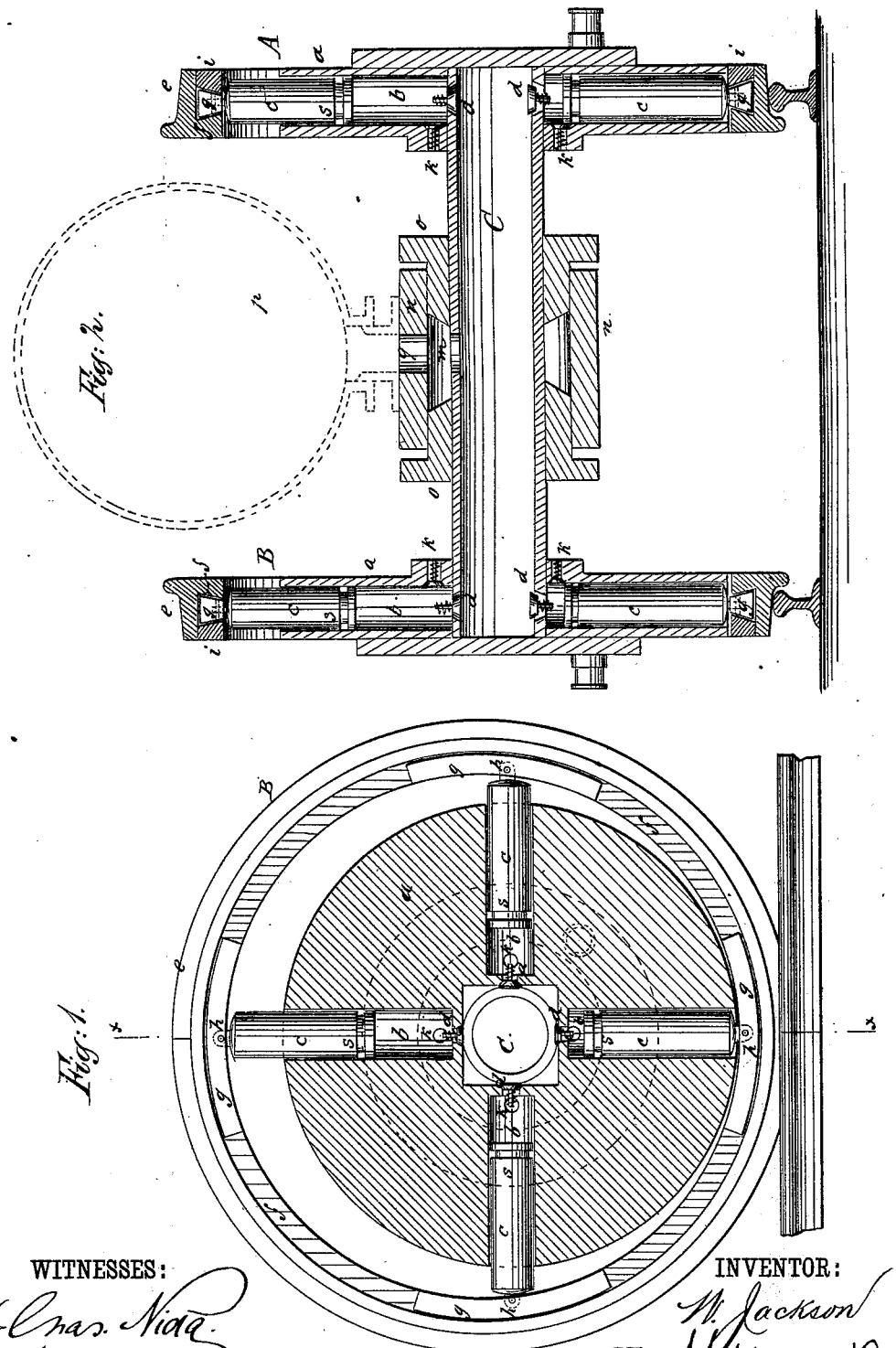

UNITED STATES PATENT OFFICE.

WILLIAM JACKSON, OF MILLERSTOWN, PENNSYLVANIA.

IMPROVEMENT IN AIR-COMPRESSING APPARATUS FOR LOCOMOTIVES.

Specification forming part of Letters Patent No. 218,029, dated July 29, 1879; application filed December 13, 1878.

*To all whom it may concern:*

Be it known that I, WILLIAM JACKSON, of Millerstown, in the county of Butler and State of Pennsylvania, have invented a new and Improved Air-Compressing Apparatus for Locomotives, of which the following is a specification.

My invention relates to locomotives that are driven by compressed air; and my object is to avail of the motion and weight of the locomotive to compress the air that is used to drive it.

My invention consists in forming the wheels of the locomotive, preferably the driving-wheels, with radial air-compressing cylinders and pistons that are operated by eccentric motion of the tire with reference to the main body of the wheel, so that as the locomotive moves forward the pistons act in succession to force air through the hollow axle of the wheel into a compression-chamber, where it is stored for use in driving the locomotive.

In the accompanying drawings, Figure 1 is a sectional side elevation of a locomotive driving-wheel constructed in accordance with my invention. Fig. 2 is a sectional elevation on the line of the axle.

Similar letters of reference indicate corresponding parts.

The wheels A and B are fitted tightly upon the hollow axle C, that is to support a portion of the weight of the locomotive, as usual. The air-compression devices are applied in connection with both wheels A B, and the description and reference to one will answer for both.

The main body $a$ of the wheel is formed with radial holes $b$, extending from the outside to near the center, preferably four in number, and at equal distances apart. These openings $b$ form cylinders, in which are fitted the pistons or plungers $c$, and at the bottom of each cylinder is an opening, $d$, to the inside of axle C, which opening is provided with a valve that opens to admit air into axle C, and closes to prevent air escaping therefrom.

$e$ is the tire of the wheel, constructed with a flange, as usual; but instead of being shrunk on the body $a$, the tire is made of greater diameter than $a$, and its inner rim formed with an annular dovetailed groove, $f$, that receives the cross-heads $g$ of the pistons $c$, these cross-heads $g$ being formed in the arc of a circle corresponding to groove $f$, and held to the pistons by a loose pivot-joint, $h$.

To permit of placing the parts together, the inner rim of $e$ is in two parts, the ring $i$ being in a separate piece, that is to be inserted and secured after the heads are in place.

The weight of the locomotive upon the axle C will cause the tire $e$ to assume an eccentric position in relation to the body $a$ of the wheel, and as the locomotive moves forward the pistons $c$ will be thrown in and out of the cylinders $b$. The pistons serve as spokes to the tire, to prevent its dislocation laterally.

By the action described the air in the cylinders $b$ is forced out of them in succession through valves $d$ into the hollow axle C. Near the bottom of each cylinder is an opening, $k$, covered by a spring-valve, that allows the cylinder to refill with air when the pistons $c$ withdraw.

In the side of the axle C, midway between the wheels A B, is an opening, $m$, and around the axle is a sleeve, $n$, held concentric with $c$ by collars $o$ $o$, which parts also form a stuffing-box, wherein axle C turns.

I have shown in dotted lines a receiver, $p$, for the air that is forced through the opening $m$ and through the opening $q$ in sleeve $n$ into the receiver, where it will be stored for use in driving the locomotive. The packing prevents escape of air, and the opening $m$ will discharge into the annular space formed by sleeve $n$.

The cross-heads $g$ might be connected to pistons $c$ by a pivot-pin and boxes, with a key, in the usual manner of connecting pistons, and the cylinders provided with stuffing-boxes around the pistons. I have shown the pistons formed with a groove, $s$, near their inner ends, in which groove packing material may be wound.

The construction described permits the utilization of the weight and momentum of a locomotive for the purpose of compressing air, which can be afterward used for propelling the locomotive.

The reservoir of compressed air is to be filled in any desired manner before the locomotive is started, and the air used to drive the locomotive will be replaced to a great extent by the means described. The compression will continue upon down-grades, where no air is required to drive the locomotive, and also when the locomotive is moving simply by momentum after the air used for driving is cut off.

Having thus described my invention, I claim as new and desire to secure by Letters Patent—

1. The wheels A B, provided with radial cylinders, having valves $d$ $k$ and pistons operated by the eccentric movement of the tire, in combination with the hollow axle C, having the opening $m$, and the sleeve $n$, having heads $o$ and aperture $q$, as shown and described.

2. In an air-compressor for locomotives, substantially as described and shown, the dovetailed groove $f$ at the inner side of the tire, in combination with the cross-heads $g$ of the pistons, substantially as and for the purposes set forth.

3. In an air-compressor for locomotives, substantially as described, the sleeve $n$ and collars $o$ $o$, in combination with the hollow axle C, substantially as and for the purposes described.

WILLIAM JACKSON.

Witnesses:
R. S. HAMPTON,
J. F. GORMAN.